(12) United States Patent
Shiwalkar et al.

(10) Patent No.: US 11,848,454 B2
(45) Date of Patent: Dec. 19, 2023

(54) BATTERY ENCLOSURES WITH STRUCTURAL ENHANCEMENTS

(71) Applicant: Apple Inc., Cupertino, CA (US)

(72) Inventors: Abhishek P. Shiwalkar, Mountain View, CA (US); Christopher R. Pasma, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 354 days.

(21) Appl. No.: 16/844,865

(22) Filed: Apr. 9, 2020

(65) Prior Publication Data
US 2021/0320285 A1 Oct. 14, 2021

(51) Int. Cl.
*H01M 50/148* (2021.01)
*H01M 10/0585* (2010.01)

(52) U.S. Cl.
CPC ..... *H01M 50/148* (2021.01); *H01M 10/0585* (2013.01)

(58) Field of Classification Search
CPC ............... H01M 50/148; H01M 50/15; H01M 50/152; H01M 50/153; H01M 50/102; H01M 50/103; H01M 50/105; H01M 50/107; H01M 50/109; H01M 50/11; H01M 10/0585; Y02E 60/10
See application file for complete search history.

(56) References Cited

U.S. PATENT DOCUMENTS

| | | | |
|---|---|---|---|
| 9,735,400 B2 * | 8/2017 | Watanabe | H01M 50/209 |
| 2011/0250485 A1 * | 10/2011 | Tsukuda | H01M 4/13 429/153 |
| 2021/0313129 A1 * | 10/2021 | Namikawa | H01M 10/425 |

* cited by examiner

*Primary Examiner* — Matthew T Martin
*Assistant Examiner* — Ankith R Sripathi
(74) *Attorney, Agent, or Firm* — Kilpatrick Townsend & Stockton (57) ABSTRACT

Batteries according to embodiments of the present technology may include an electrode stack including a separator positioned between an anode and a cathode. The batteries may include an electrolyte. The batteries may include an enclosure extending about the electrode stack and containing the electrolyte. The enclosure may include a rigid housing defining a volume in which the electrode stack and the electrolyte are contained. The rigid housing may define a flange extending about the rigid housing. The enclosure may include a lid extending across the rigid housing. The lid may be characterized by a length and a width, and the lid may define a protrusion extending beyond the length or width on a side of the lid at a location corresponding to a predetermined strain location.

20 Claims, 4 Drawing Sheets

BATTERY ENCLOSURES WITH STRUCTURAL ENHANCEMENTS

TECHNICAL FIELD

The present technology relates to batteries. More specifically, the present technology relates to battery enclosures and configurations.

BACKGROUND

Batteries are used in many devices. As devices in which batteries are housed reduce in size, the reduced footprint may impact battery enclosure configurations and structural effects on the batteries.

SUMMARY

Batteries according to embodiments of the present technology may include an electrode stack including a separator positioned between an anode and a cathode. The batteries may include an electrolyte. The batteries may include an enclosure extending about the electrode stack and containing the electrolyte. The enclosure may include a rigid housing defining a volume in which the electrode stack and the electrolyte are contained. The rigid housing may define a flange extending about the rigid housing. The enclosure may include a lid extending across the rigid housing. The lid may be characterized by a length and a width, and the lid may define a protrusion extending beyond the length or width on a side of the lid at a location corresponding to a predetermined strain location.

In some embodiments, the rigid housing may include a conductive material maintained at negative potential. The lid may be welded to the rigid housing along the flange of the rigid housing, and a weld seam may extend about the enclosure. The weld seam may be recessed from an external edge of the lid by a first distance, and the weld seam may be recessed from an exterior edge of the lid at the protrusion by a second distance at least about 5% greater than the first distance. The protrusion may be characterized by an arcuate geometry. The enclosure may be characterized by a rectangular shape, and each side of the lid may define at least one protrusion extending from an exterior edge of the lid. The length of the enclosure may be greater than the width of the enclosure, and each side of the lid extending parallel to the length of the enclosure may define at least two protrusions extending from an exterior edge of the lid. The protrusion may extend along a length of the side of the lid less than about 5% of the length of the side of the lid. The rigid housing may define a protrusion extending beyond the length or width on a side of the rigid housing corresponding to the location of the protrusion extending beyond the side of the lid. The side of the lid may be a first side of the lid, and the protrusion may be a first protrusion. The lid may also define a second protrusion extending beyond the length or width on a second side of the lid opposite the first side of the lid. The second protrusion may be located in line with the first protrusion. The lid may define a volume, and the lid may define a flange extending about the lid similar to the rigid housing.

Some embodiments of the present technology may encompass batteries. The batteries may include an electrode stack including a separator positioned between an anode and a cathode. The batteries may include an electrolyte. The batteries may include an enclosure extending about the electrode stack and containing the electrolyte. The enclosure may include a rigid housing defining a volume in which the electrode stack and the electrolyte are contained. The rigid housing may define a flange extending about the rigid housing. The enclosure may include a lid extending across the rigid housing. The lid may define a protrusion extending beyond an exterior edge of the lid on a side of the lid. The lid may be welded to the rigid housing along the flange of the rigid housing. A weld seam may extend about the enclosure, and the weld seam may extend outward towards the protrusion proximate the protrusion along the side of the lid. The weld seam may be recessed from an external edge of the lid by a first distance, and the weld seam may be recessed from an exterior edge of the lid at the protrusion by a second distance within about 20% of the first distance.

In some embodiments, the side of the lid may be a first side of the lid, and the protrusion may be a first protrusion. The lid may also define a second protrusion extending beyond an exterior edge on a second side of the lid opposite the first side of the lid. The second protrusion may be located in line with the first protrusion, and the weld seam may be recessed from an exterior edge of the lid at the second protrusion by a second distance within about 20% of the first distance. The rigid housing may define a protrusion extending beyond an exterior edge on a side of the rigid housing corresponding to a location of the protrusion extending beyond the side of the lid.

Some embodiments of the present technology may encompass batteries. The batteries may include an electrode stack comprising a longitudinal body section and a lateral body section extending from and normal to the longitudinal body section. The batteries may include an electrolyte. The batteries may include an enclosure extending about the electrode stack and containing the electrolyte. The enclosure may include a rigid housing defining a volume in which the electrode stack and the electrolyte are contained. The rigid housing may be characterized by a longitudinal body section and a lateral body section extending from and normal to the longitudinal body section. An intersection of the longitudinal body section and the lateral body section may define an interior corner and an exterior corner. The rigid housing may define a flange extending about the rigid housing. The enclosure may include a lid extending across the rigid housing. The lid may define a protrusion extending beyond an exterior edge of the lid on a side of the lid extending to the exterior corner of the rigid housing.

In some embodiments, the rigid housing may define the interior corner as an arcuate shape recessed from a planar intersection of a sidewall of the lateral body section and a sidewall of the longitudinal body section. The lid may be welded to the rigid housing along the flange of the rigid housing, and a weld seam may extend continuously about the enclosure. The side of the lid may be a longitudinal side of the lid extending to the exterior corner. The protrusion may be a first protrusion, and the lid may also define a second protrusion extending beyond an exterior edge of the lid on a lateral side of the lid extending to the exterior corner. The lid may define at least two protrusions along the longitudinal side of the lid extending to the exterior corner.

Such technology may provide numerous benefits over conventional technology. For example, the present batteries may be characterized by improved structural integrity under operating conditions. Additionally, the batteries may afford improved structural performance while having limited impact on the footprint of the battery. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed with a balance of characteristics in mind. For example, including larger batteries may provide increased usage between charges, however, the larger batteries may require larger housing, or increased space within the device. As device designs and configurations change, especially in efforts to reduce device sizes, the available space for additional battery components may be constrained. These constraints may include restrictions in available volume as well as the geometry of such a volume.

Some battery enclosure materials may afford reduced production tolerances, which may allow an increase in the size of battery cell components within the enclosure. For example, rigid enclosures, which may also be conductive enclosures, may be characterized by reduced tolerance requirements during manufacturing as more uniform and consistent processing and fabrication may be performed. This may allow an increase in volume within a specified footprint for an electrode stack, which may afford an increase in energy density for the battery. Sealing rigid enclosures may be performed differently than with polymeric or pouch materials, and may include welding, bonding, or other sealing that may produce a seam about the enclosure. As batteries operate, an amount of gas may be formed, or expansion or swelling of the cell may occur, which may increase under certain fault conditions. While a pouch may flex with cell expansion during operation, a rigid enclosure may be affected differently.

For example, as the enclosure expands, such as due to a pressure increase within the enclosure, deformation may occur along an exterior to accommodate a bulging interior or middle region. This may produce pinch points at specific locations about the cell depending on the cell geometry. As expansion continues, the strain at these locations may increase, which may eventually produce sheer forces against the weld or seam, and which may cause the seam to fail and the cell to lose the hermetic structure. Some conventional technologies may accommodate this action by extending the seam further inward from an exterior edge, and/or extending a wall outside the seam fully about the battery enclosure. This may both reduce the volume for cell material, and create excessive waste material external to the seam, which may impact other components within an electronic device by increasing the volume of the battery. The present technology overcomes these issues by forming protrusions at specific locations about an exterior of a cell enclosure. The protrusions may provide structural reinforcement at precise locations, while limiting an effect on the overall battery footprint. After illustrating an exemplary cell and enclosure that may be used in embodiments of the present technology, the disclosure will describe battery designs having structural reinforcement protrusions about the cell.

Although the remaining portions of the description will reference lithium-ion batteries, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, phones and mobile devices, watches, glasses, bracelets, anklets, and other wearable technology including fitness devices, handheld electronic devices, tablets, laptops and other computers, as well as other devices that may benefit from the use of the variously described battery technology.

Figure 1:
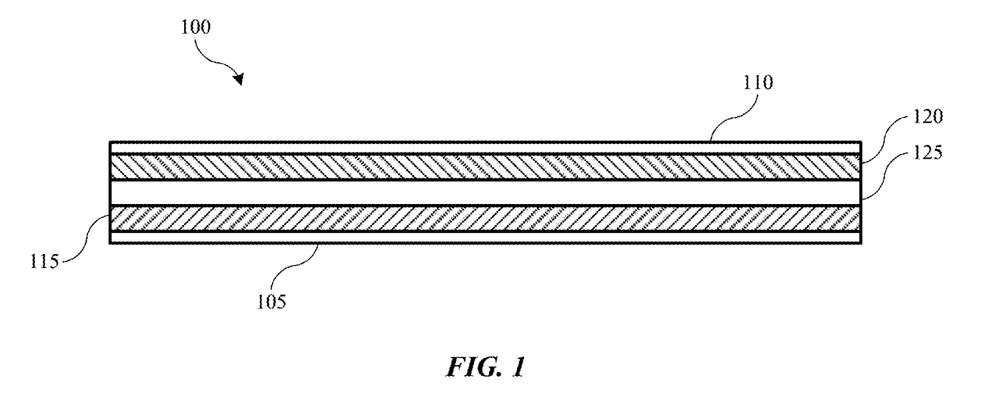
FIG. 1 shows a schematic cross-sectional view of a battery cell according to some embodiments of the present technology.

FIG. 1 depicts a schematic cross-sectional view of an energy storage device or battery cell 100 according to embodiments of the present technology. Battery cell 100 may be or include a battery cell, and may be one of a number of cells coupled together to form a battery structure. As would be readily understood, the layers are not shown at any particular scale, and are intended merely to show the possible layers of cell material of one or more cells that may be incorporated into an energy storage device. In some embodiments, as shown in FIG. 1, battery cell 100 includes a first current collector 105 and a second current collector 110. In embodiments one or both of the current collectors may include a metal or a non-metal material, such as a polymer or composite that may include a conductive material. The first current collector 105 and second current collector 110 may be different materials in embodiments. For example, in some embodiments the first current collector 105 may be a material selected based on the potential of an anode active material 115, and may be or include copper, stainless steel, or any other suitable metal, as well as a non-metal material including a polymer. The second current collector 110 may be a material selected based on the potential of a cathode active material 120, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, silicon oxide, silicon alloy, graphite, carbon, a tin alloy, lithium metal, a lithium-containing material, such as lithium titanium oxide (LTO), a combination of any of these materials, or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide lithium nickel manganese cobalt oxide, lithium nickel cobalt aluminum oxide, lithium nickel cobalt manganese oxide, lithium nickel cobalt aluminum oxide, lithium titanate, or a combination of any of these materials, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film, a ceramic membrane, or a material that may allow lithium ions to pass through the structure while not otherwise conducting electricity. Active materials 115 and 120 may additionally include an amount of electrolyte in a completed cell configuration, which may be absorbed within the separator 125 as well. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semi-metal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities.

Although illustrated as single layers of electrode material, battery cell 100 may be any number of layers. Although the cell may be composed of one layer each of anode and cathode material as sheets, the layers may also be formed into a jelly roll design, or folded design, prismatic design, or any form such that any number of layers may be included in battery cell 100. For embodiments which include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from or be coupled with the enclosure to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in batteries according to the present technology. It is to be understood, however, that any number of battery and battery cell designs and materials that may include charging and discharging capabilities similarly may be encompassed by or incorporated with the present technology.

Figure 2:
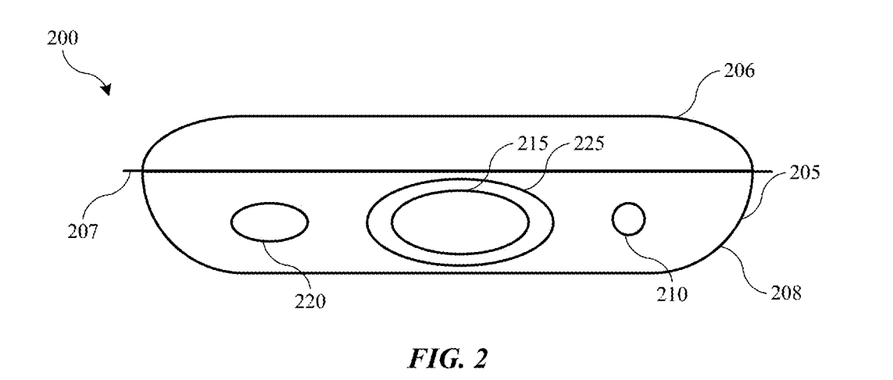
FIG. 2 shows a schematic front elevation view of a battery according to some embodiments of the present technology.

FIG. 2 shows a schematic elevation view of a battery 200 according to some embodiments of the present technology. As illustrated, battery 200 may include a housing or enclosure 205, which may include any number of battery cells, including cells as previously described, incorporated within the enclosure. Enclosure 205 may include a rigid housing, and may include a conductive housing, such as stainless steel, or any other metal or conductive material. The conductive housing may be maintained at positive or negative potential in embodiments, and may be maintained at negative potential, which may then operate as a device ground, and be considered similar to a neutral connection within a device incorporating the battery. Additionally, by using a rigid housing instead of a flexible pouch, fabrication tolerances on the battery dimensions may be reduced, which may afford increased volume for the internal battery cells, and which may provide increased capacity over conventional designs. The enclosure or can may include a lid 206 for the rest of the rigid housing 208, which may define an internal volume in which cell materials are incorporated, such as an electrode stack. The lid 206 and housing 208 may include a seamless or substantially seamless exterior form providing an internal volume in which the battery cell or cells and electrolyte may be contained.

The housing 208 may define a flange 207, which may extend from the base and provide a landing on which the lid may be seated and coupled. The lid may be bonded, joined, or welded to the flange of the housing in any number of ways, which may provide a weld seam between the two components, and which may provide a hermetic enclosure for the battery cell materials inside. In some embodiments, the weld seam may extend continuously about the enclosure. Lid 206 may define a volume as illustrated similarly to housing 208, although in some embodiments as will be illustrated further below, lid 206 may be a planar or substantially planar cover. Battery 200 may include one or more terminals extending from battery enclosure 205 and providing electrical access to the battery cell. Additionally, a port 210 may be positioned along a surface of the enclosure as illustrated. Port 210 may be a fill port or other access to battery 200, and may be sealed in embodiments. Port 210 may be positioned proximate a lateral edge of battery 200 and may be used as an injection location for electrolyte to fill battery 200 and form a functioning cell.

A first electrode terminal 215 and a second electrode terminal 220 may extend from or be accessible along a surface, such as a front surface of battery enclosure 205. In some embodiments, each of the first electrode terminal and the second electrode terminal may extend from the surface of battery enclosure 205 a similar distance. In some embodiments, first electrode terminal 215 may extend outward from the surface further than second electrode terminal 220. As previously noted, in some embodiments the enclosure 205 of battery 200 may be conductive and may be at the potential of one of the electrodes, such as the anode, although the housing may also be maintained at cathode potential. The second electrode terminal 220 may represent the electrode terminal of the potential at which the housing is maintained. Accordingly, the terminal may be a contact, tab, or access of the housing. The first electrode terminal 215, however, may be at the opposite potential of the housing and/or the second electrode terminal 220, and may be maintained or electrically isolated from the rest of the housing. For example, first electrode terminal 215 may be the cathode terminal, although the terminal may also be maintained at anode potential in other embodiments.

To isolate the first electrode terminal 215 from the rest of the housing, a spacer 225 may extend circumferentially about the first electrode terminal, and extend through the housing of battery enclosure 205. In some embodiments, spacer 225 may fully isolate first electrode terminal 215 from the battery enclosure 205 both internally and externally to avoid a potential short between the housing, which may be at anode potential, and first electrode terminal 215, which may be at cathode potential. Battery 200 illustrates one type of housing or enclosure that may be encompassed by aspects of the present technology, including incorporating electrode stacks as described further below. Additional pouch enclosures may similarly be encompassed by the present technology and are included in aspects described further below.

Figure 3:
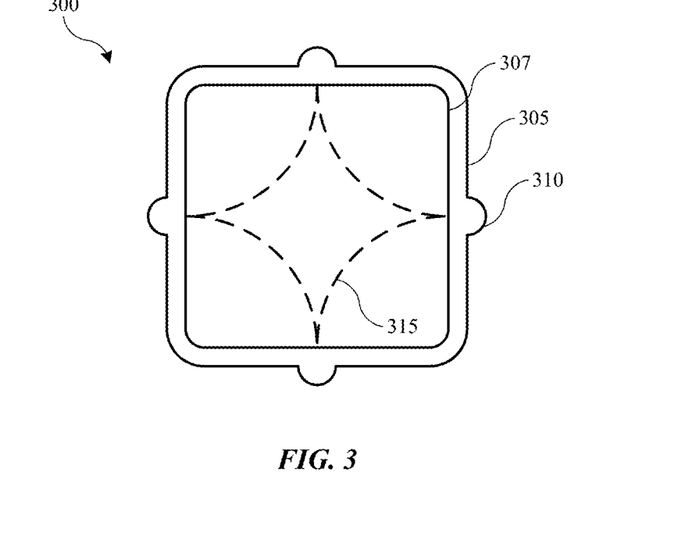
FIG. 3 shows a schematic top view of a battery according to some embodiments of the present technology.

Turning to FIG. 3 is shown a schematic top view of a battery 300 according to some embodiments of the present technology. Battery 300 may include additional details for batteries discussed previously, such as battery 200, and battery 300 may include any feature, component, or characteristic of battery 200. Battery 300 may include any aspect of battery cells as described previously, and which may be incorporated within the illustrated housing of battery 300. Battery 300 may illustrate enclosures according to some embodiments of the present technology incorporating protrusions configured to improve structural integrity of the enclosure.

As described previously, rigid enclosures affected by increasing internal pressure may deform to accommodate the expansion of the cell. For example, as the cell expands centrally, which may be furthest from a seam reinforcing the enclosure, where welding, bonding, or other coupling has been performed, the central expansion may cause exterior regions to be drawn towards the center to accommodate the expansion. Depending on the geometry of the housing, increased strain may occur about the enclosure affecting the weld seam, and the highest strain may occur at discrete positions about cell. These locations of highest strain may eventually cause the seam to fail at these specific locations, which may damage the cell. Although materials may be formed to greater thickness, seams may be increased in size, and material outside of the seam may be extended, these solutions create an overall increase in battery size, which may reduce the energy density of the specific form factor. By incorporating protrusions in specific locations characterized by highest strain during deformation, the present technology may reduce seal rupturing and increase internal pressure ranges at which the battery can operate, while having a limited impact on cell form factor.

As illustrated in FIG. 3, battery 300 may include a lid 305 extending about a rigid housing. The lid may be sealed with the rigid enclosure about the flange of the housing as previously described, which may provide a seam between the two components. Depending on the process to seal the two components, a seam may not be visible, but may extend about the enclosure between the components. Exemplary seam 307 is shown merely to illustrate a location of where the components may be joined, but it is to be understood that a seam may not be visible in some embodiments of the present technology.

Lid 305 may be characterized by a length and a width, which may correspond to an overall cell length and width. Lid 305 may define one or more protrusions 310 extending from an exterior edge of one or more sides of the lid as well. The length and width of the lid may correspond to dimensions excluding the protrusions, for example, and thus the protrusions 310 may extend beyond the length and/or width of the battery as illustrated. The protrusions may be integrally formed on the lid, which may be a monolithic structure including the protrusions. For example, during manufacturing where the lid form is cut, the protrusions may be incorporated in the die applied, or the protrusions may be cut during final material removal where additional flange and lid material may be removed after sealing, which may allow formation of the protrusions. The locations of the protrusions 310 may be selected based on specific strain characteristics of the cell.

It is to be understood that batteries according to embodiments of the present technology may include any number of configurations or geometries. Regardless of the configuration, testing may be performed to determine where failure or high strain locations may be. For example, hydrostatic pressure testing may be performed to identify for a given configuration where pinching, or high strain locations may produce an increased likelihood of seal breaching or failure due to sheer strain that may overcome the seam at a particular location. As one non-limiting example, FIG. 3 illustrates a square battery. As internal pressure increases within the enclosure, a center or central area may bulge outward. This may create a strain on the vessel, and produce strain fields across the lid, which is coupled about the weld seam, as illustrated by dashed lines 315. These strain fields may be the result of the asymmetric nature of the enclosure configuration. As pressure continues to increase, these exterior points of highest strain may cause plastic deformation of the enclosure, which may include inward pinching walls proximate the area of highest strain, which may be about or near the midpoints of each side for a square vessel. These areas pinching may increase sheer stress on the seam between the lid and the housing, which may eventually rupture when the pressure exceeds a threshold of the components based on the thickness, materials, and other variables noted above.

The present technology may identify for any selected geometry where these areas likely to experience maximum plastic deformation are located about the vessel, and provide a protrusion at one or more, including all, of these locations. The protrusions may locally reinforce the enclosure structure by resisting the pinching that may occur at the locations of maximum strain as the enclosure bulges centrally. By extending or elongating the flange region in these locations, the local position along the seam may be reinforced and provided increased resistance to strain. Additionally, because the protrusions may be positioned at predetermined locations where known maximum strain may occur during pressure events, the protrusion may be minimized in size to limit an effect on the footprint of the battery.

Batteries according to the present technology may include any number of protrusions about the enclosure depending on the geometry. Although any number of sides of the enclosure may incorporate one or more protrusions, in some embodiments, such as where the battery is rectangular, each side of the lid may define at least one protrusion extending from an exterior edge of the lid. The protrusions may be characterized by any geometry, which may include any amount of linear or arcuate features. In some embodiments, as illustrated, the protrusions may be characterized by a partially, substantially, of completely arcuate shape, which may more uniformly distribute strain at the locations of maximum strain. As one non-limiting example as illustrated, the protrusions may be characterized by a semicircular shape extending from the exterior edge of the battery at the diameter of the semicircle. Additionally, the protrusions may be characterized by a minimum diameter, or length along the exterior edge of the enclosure.

For example, because the location of maximum strain may be known or predetermined through pressure testing, the protrusion may extend along a length of a side of the lid that may be less than or about 20% of the overall side length. Depending on the overall battery enclosure sizing, the protrusion may also extend along a length of a side of the lid that may be less than or about 15% of the overall side length, and may extend less than or about 12% of the overall side length, less than or about 10% of the overall side length, less than or about 9% of the overall side length, less than or about 8% of the overall side length, less than or about 7% of the overall side length, less than or about 6% of the overall side length, less than or about 5% of the overall side length, less than or about 4% of the overall side length, less than or about 3% of the overall side length, less than or about 2% of the overall side length, less than or about 1% of the overall side length, or less.

Depending on the geometry of the enclosure, the protrusions may be at least partially aligned in some embodiments of the present technology. For example, as illustrated in the figure, a protrusion on one side of the cell may be aligned or positioned in line with a protrusion on an opposite side of the cell. For some embodiments having rectangular or other geometries, all protrusions may extend in line with another protrusion extending from an opposite side of the enclosure.

Figure 4:
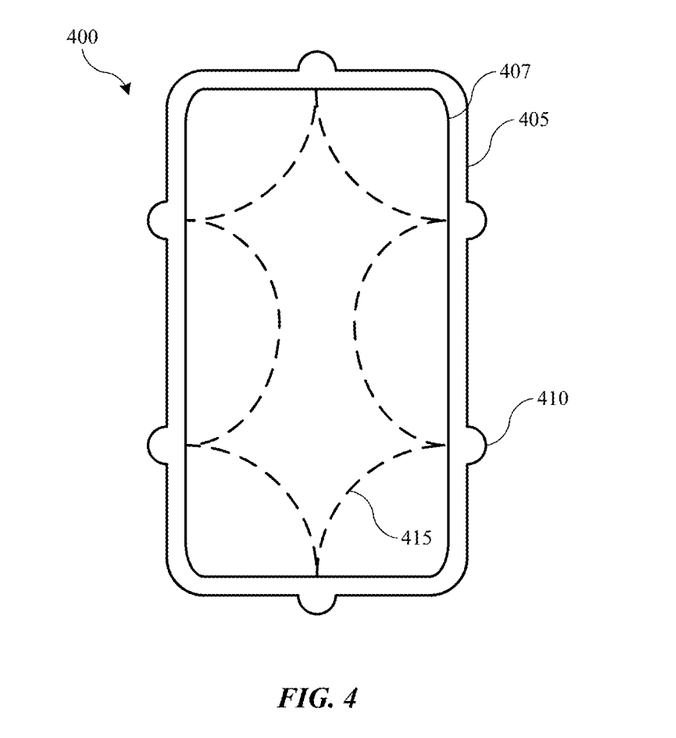
FIG. 4 shows a schematic top view of a battery according to some embodiments of the present technology.

Different configurations may be characterized by different strain fields caused by internal pressure increases, which may be utilized to inform the protrusion locations or configurations about the enclosures. FIG. 4 shows a schematic top view of a battery 400 according to some embodiments of the present technology, such as illustrating a lid 405 of the battery enclosure. Battery 400 may include any of the features or characteristics of any battery or component as previously described, including battery cells and electrolytes that may be incorporated within the battery housing. Battery 400 may be generally similar to battery 300, although battery 400 may be characterized by a rectangular configuration having a length greater than a width of the enclosure.

Battery 400 may include a seam 407, which again may be a representation in some embodiments of a non-visible bond or seal between the lid and an underlying flange of a housing with which the lid is coupled. During increasing internal pressure, expansion through a central region may cause different strain fields across the lid, as illustrated by dashed lines 415. Because the strain may be distributed to multiple locations along the sides extending along or parallel to the length of the cell, protrusions 410 may be formed at multiple locations across the sides. For example, the strain fields illustrated may correspond to a battery having a length that is twice the width, and thus two strain locations may extend along the longer sides relative to the shorter sides. It is to be understood that based on testing and/or modeling based on pressure testing for any particular enclosure geometry, the locations of maximum strain may be identified, and then protrusions may be incorporated at these locations during manufacturing. As will be described further below, additional adjustments may similarly be applied with the protrusions according to embodiments of the present technology.

Figure 5A:
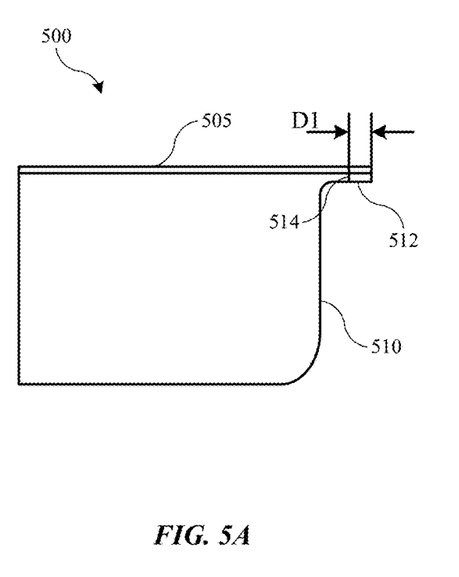
FIGS. 5A-5B show schematic partial elevation views of a battery according to some embodiments of the present technology.
Figure 5B:
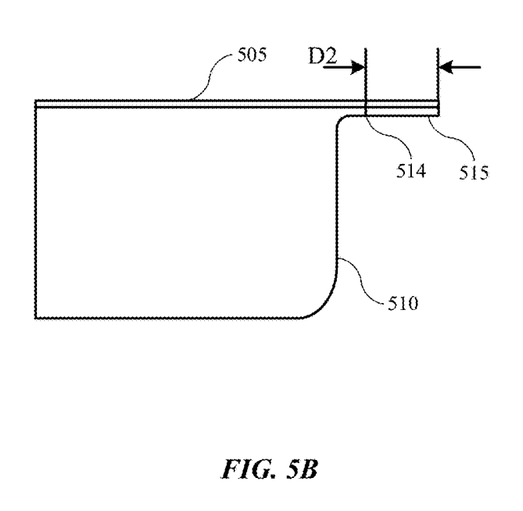

FIGS. 5A-5B show partial elevation views of a battery 500 according to some embodiments of the present technology, and may illustrate an amount of extension for protrusions relative to external edges of the enclosure. Battery 500 may include any of the features or characteristics of any battery or component as previously described, including battery cells and electrolytes that may be incorporated within the battery housing. Battery 500 may be characterized by any geometry previously described, or any other geometry as may be encompassed by the present technology.

As illustrated in FIG. 5A, lid 505 may be coupled with housing 510 about a flange 512 of housing 510. Lid 505 may be seated on the flange 512, and the components may be joined or welded about this location as described above, and as may be illustrated by line 514, where a seam may extend, such as in cross-section between the components. The seam may be recessed from an external edge of the lid by a first distance D1 as illustrated in the figure, and may extend about the enclosure as previously described. FIG. 5B may illustrate the same components across a protrusion 515 extending from an external edge of the enclosure. As shown, the protrusion may be a continuous extension from the lid 505 as previously explained, and in embodiments the housing 510 may similarly define a protrusion corresponding to the location of each protrusion extending beyond the side of the lid. The seam 514 may similarly extend along the enclosure proximate the protrusion, however, the seam may be further recessed from an exterior edge of the protrusion as illustrated.

For example, at a protrusion, the weld seam may be recessed from an external edge of the lid by a second distance D2, which may be greater than distance D1, and may be up to or at least about 2% greater than the distance D1. Depending on the overall size of the enclosure, the distance D2 may be greater than or about 5% greater than the distance D1, and may be greater than or about 7% greater than the distance D1, greater than or about 10% greater than the distance D1, greater than or about 15% greater than the distance D1, greater than or about 20% greater than the distance D1, greater than or about 25% greater than the distance D1, greater than or about 30% greater than the distance D1, greater than or about 35% greater than the distance D1, greater than or about 40% greater than the distance D1, greater than or about 45% greater than the distance D1, greater than or about 50% greater than the distance D1, greater than or about 55% greater than the distance D1, greater than or about 60% greater than the distance D1, greater than or about 65% greater than the distance D1, greater than or about 70% greater than the distance D1, greater than or about 75% greater than the distance D1, greater than or about 80% greater than the distance D1, greater than or about 85% greater than the distance D1, greater than or about 90% greater than the distance D1, greater than or about 95% greater than the distance D1, greater than or about 100% greater than the distance D1, or greater. By increasing the flange locally with protrusions according to embodiments of the present technology, strain resistance can be increased substantially at locations of maximum strain during internal expansion events.

Figure 6:
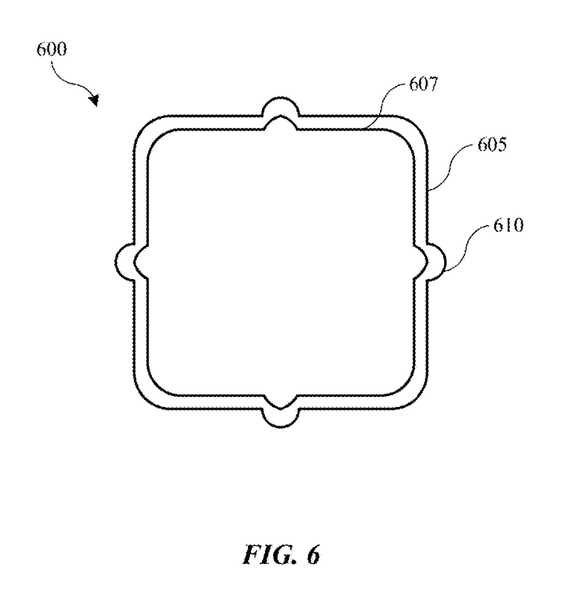
FIG. 6 shows a schematic top view of a battery according to some embodiments of the present technology.

FIG. 6 shows a schematic top view of a battery 600 according to some embodiments of the present technology, and may illustrate an additional seam formation for batteries according to embodiments of the present technology. Battery 600 may include any of the features or characteristics of any battery or component as previously described, including battery cells and electrolytes that may be incorporated within the battery housing. Battery 600 may be characterized by any geometry previously described, or any other geometry as may be encompassed by the present technology.

The figure may illustrate a top view of battery 600, such as viewing lid 605, including protrusions 610 as previously described. Battery 600 may include a seam 607, which again may be a representation in some embodiments of a non-visible bond or seal between the lid and an underlying flange of a housing with which the lid is coupled. As illustrated, in some embodiments the seam may be formed to extend outward towards the protrusion near or at each protrusion along each side of the lid. By adjusting the seam, a further distribution of force at the location may be provided. The extension of the seam outward may correspond to at least partially maintain a more uniform recess of the seam from an exterior edge of the battery, including across the protrusions.

Similar to as explained above for FIG. 5, the seam 607 may be recessed from an external edge of the lid by a first distance D1 at non-protrusion locations about the enclosure. Additionally, the seam may be recessed from an external edge of the lid at locations across a protrusion by a second distance D2. The distance D2 may be greater than the distance D1 as previously described, although in some embodiments outward extension of the seam may reduce the distance D2 to be less than or about 20% greater than D1. In some embodiments the distance D2 may be less than or about 15% greater than D1, and may be less than or about 12% greater than D1, less than or about 10% greater than D1, less than or about 9% greater than D1, less than or about 8% greater than D1, less than or about 7% greater than D1, less than or about 6% greater than D1, less than or about 5% greater than D1, less than or about 4% greater than D1, less than or about 3% greater than D1, less than or about 2% greater than D1, less than or about 1% greater than D1, or less, and D2 may be equal to or less than D1 in some configurations. By adjusting protrusion locations, or configurations, as well as seam formation, embodiments of the present technology may provide a number of aspects for improving resistance to plastic deformation at specified locations about an enclosure.

Figure 7:
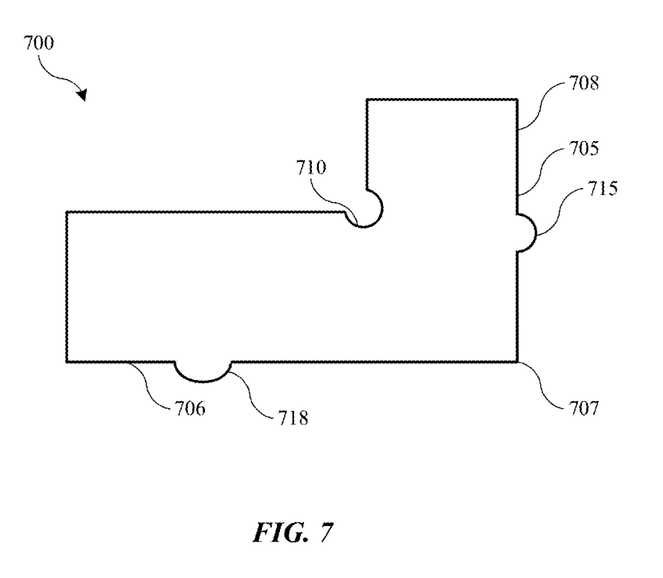
FIG. 7 shows a schematic top view of a battery according to some embodiments of the present technology.

Turning to FIG. 7 is illustrated a schematic top view top view of a battery 700 according to some embodiments of the present technology, and may illustrate an additional enclosure configuration incorporating protrusions for batteries according to embodiments of the present technology. Battery 700 may include any of the features or characteristics of any battery or component as previously described, including battery cells and electrolytes that may be incorporated within the battery housing. Battery 700 may be characterized by any geometry previously described, or any other geometry as may be encompassed by the present technology. Battery 700 may also show additional protrusion characteristics that may equally apply to any configuration or battery described above. Some embodiments of the present technology may encompass multi-dimensional battery configurations as illustrated, which may include oblong or non-rectangular shapes, although it is to be understood that the present technology may benefit any battery design or configuration, and may encompass any enclosure geometry.

FIG. 7 illustrates a top view of an exemplary battery, such as a view of a lid 705, similar to other top views as previously described. It is to be understood that the lid may similarly overly and/or be coupled with an underlying housing including a flange as previously described, which may include a continuous seam or weld about the enclosure as described above. Although any number of battery and battery cell configurations may be encompassed by the present technology, batteries and battery cells according to some embodiments of the present technology may be characterized by geometries other than rectangular, which may include an L-shaped configuration as illustrated. It is to be understood that the shape defined by the enclosure may similarly or identically correspond to the shape of the electrode stack. In this configuration, the battery, which may include the enclosure, as well as the lid, a rigid housing, and an internal electrode stack, may include a longitudinal body section 706 and a lateral body section 708. The lid and housing may also be characterized by any aspect previously described for lids and housings. The electrode stack may similarly include a longitudinal body section and a lateral body section.

Both sections may extend from a corner of the enclosure, and may extend normal to one another, although any angle of extension may be accommodated, which may be greater than or less than ninety degrees. Longitudinal body section 706 may be characterized by a length in a first direction from an exterior corner 707, and lateral body section 708 may be characterized by a length in a second direction perpendicular to the first direction from exterior corner 707. Although shown as extending to different lengths, it is to be understood that the enclosure sections may extend to a similar length or any different lengths in each direction. Non-rectangular configurations may provide further accommodation for electronic devices, which may incorporate additional components providing other than rectangular volumes for batteries.

Battery 700 may also define an interior corner 710, which may resemble a joint, such as a recessed corner of the joint, at which the lateral body section and the longitudinal body section intersect. Interior corner 710 may be characterized by any number of shapes, including a straight corner. However, a rigid corner may challenge fabrication at the location because tooling may not accommodate an exactly square interior corner. Accordingly, in some embodiments interior corner 710 may be characterized by a different shape. Any number of alternative shapes may be used, including a curved corner as illustrated. For example, the enclosure components may define the interior corner as recessed from what would be a rigid corner along the adjacent sidewalls, were a lateral side and longitudinal side extended directly together to produce the interior corner. As illustrated, battery 700 defines the interior corner as an arcuate shape recessed from the planar intersection along an interior side of longitudinal body section 706 and lateral body section 708.

Similar to other configurations, the lid 705 and underlying housing may define a protrusion extending beyond an exterior edge of the lid on one or more sides of the lid. The geometry of the enclosure may impact the location and distribution of the protrusions in embodiments of the present technology. For example, pressurized expansion of the enclosure may affect exterior surfaces greater than interior surfaces in some embodiments, or may affect interior surfaces greater than exterior surfaces. Accordingly, although protrusions may be included as discussed above, in some embodiments protrusions 715 may be included on some sides while excluded from other sides. For example, and understanding that the opposite configuration may similarly be encompassed, in some embodiments one or more protrusions may be formed on one or both sides of the lid and/or housing extending to the exterior corner 707 of the enclosure, such as along exterior sides of sections 706 and 708 as illustrated.

Because the sides may be characterized by different lengths, a different number of protrusions may be included on each side. For example, while one or more protrusions 715 may be included on the shorter exterior side of section 708, in some embodiments at least two or more protrusions may be included on the longer exterior side of section 706, although a single protrusion may similarly be included. Additionally, different protrusion geometries may be utilized along the different sides, which may affect resistance to plastic deformation or strain. For example, protrusion 718 as illustrated may be characterized by a greater length along the exterior side of section 706 of the lid or housing than protrusion 715, and/or may be characterized by a greater extension from the side of the enclosure. Any of the previous batteries or configurations may similarly incorporate different geometries of protrusions, which may provide additional configuration flexibility to limit or control an impact on the footprint of the battery. Additionally, although pinch points or other strain locations may form at or near a center of a side, in some embodiments, and depending on geometry and expansion characteristics, the strain locations may occur offset from a center of a side, such as between a center location of a side and an end of a side. Accordingly, protrusions may be offset from a central location as illustrated. By incorporating protrusions according to embodiments of the present technology, improved resistance to internal expansion may be afforded to batteries, while limiting an impact on the footprint of the battery.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a protrusion" includes a plurality of such protrusions, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery comprising:
    an electrode stack comprising a separator positioned between an anode and a cathode;
    an electrolyte; and
    an enclosure extending about the electrode stack and containing the electrolyte, the enclosure comprising:
        a rigid housing defining a volume in which the electrode stack and the electrolyte are contained, wherein the rigid housing defines a flange extending about the rigid housing, and
        a lid extending across the rigid housing and sealed to the rigid housing at a seam defined between the lid and the flange, wherein the lid is characterized by a perimeter external edge defined outward from the seam and having a length and a width, wherein the lid defines a first protrusion extending outward from the perimeter external edge beyond the length on a first side of the lid, wherein the lid defines a second protrusion extending outward from the perimeter external edge beyond the width on a second side of the lid, and wherein each of the first protrusion and the second protrusion is configured to provide structural reinforcement to the seam at a location corresponding to a predetermined strain location.

2. The battery of claim 1, wherein the rigid housing comprises a conductive material maintained at negative potential.

3. The battery of claim 1, wherein the lid is welded to the rigid housing along the flange of the rigid housing, and wherein the seam comprises a weld seam that extends about the enclosure.

4. The battery of claim 3, wherein the weld seam is recessed from the perimeter external edge of the lid by a first distance, and wherein the weld seam is recessed from an exterior edge of the lid at the first protrusion by a second distance at least about 5% greater than the first distance.

5. The battery of claim 1, wherein the protrusion is characterized by an arcuate geometry.

6. The battery of claim 1, wherein the enclosure is characterized by a rectangular shape, and wherein each side of the lid defines at least one protrusion extending from an exterior edge of the lid.

7. The battery of claim 6, wherein the length of the enclosure is greater than the width of the enclosure, and wherein each side of the lid extending parallel to the length of the enclosure defines at least two protrusions extending from an exterior edge of the lid.

8. The battery of claim 1, wherein the protrusion extends along a length of the side of the lid less than about 5% of the length of the side of the lid.

9. The battery of claim 1, wherein the rigid housing defines a housing protrusion extending beyond the length or width on a side of the rigid housing corresponding to a location of the first protrusion or the second protrusion extending beyond the first or second side of the lid.

10. The battery of claim 1, wherein the lid further defines a third protrusion extending beyond the length or the width on a third side of the lid opposite the first side of the lid or the second side of the lid.

11. The battery of claim 1, wherein the flange is a first flange, wherein the lid defines a volume, and wherein the lid defines a second flange extending about the lid similar to the first flange of the rigid housing.

12. A battery comprising:
an electrode stack comprising a separator positioned between an anode and a cathode;
an electrolyte; and
an enclosure extending about the electrode stack and containing the electrolyte, the enclosure comprising:
a rigid housing defining a volume in which the electrode stack and the electrolyte are contained, wherein the rigid housing defines a flange extending about the
a lid extending across the rigid housing and welded to the rigid housing at a weld seam defined between the lid and the flange, wherein the lid is characterized by a perimeter external edge defined outward from the weld seam, wherein the lid defines a first protrusion extending outward from the perimeter external edge of the lid on a first side of the lid, wherein the lid defines a second protrusion extending outward from the perimeter external edge on a second side of the lid, and wherein each of the first protrusion and the second protrusion is configured to provide structural reinforcement to the weld seam, and wherein the weld seam extends outward towards the first protrusion and the second protrusion proximate the protrusion along the side of the lid.

13. The battery of claim 12, wherein the weld seam is recessed from the perimeter external edge of the lid by a first distance, and wherein the weld seam is recessed from an exterior edge of the lid at the first protrusion and the second protrusion by a second distance within about 20% of the first distance.

14. The battery of claim 13, wherein the lid further defines a third protrusion extending beyond an exterior edge on a third side of the lid opposite at least one of the first side of the lid or the second side of the lid, and wherein the weld seam is recessed from an exterior edge of the lid at the third protrusion by a second distance within about 20% of the first distance.

15. The battery of claim 12, wherein the rigid housing defines a housing protrusion extending beyond an exterior edge on a side of the rigid housing corresponding to a location of the protrusion extending beyond the side of the lid.

16. A battery comprising:
an electrode stack comprising a longitudinal body section and a lateral body section extending from and normal to the longitudinal body section;
an electrolyte; and
an enclosure extending about the electrode stack and containing the electrolyte, the enclosure comprising:
a rigid housing defining a volume in which the electrode stack and the electrolyte are contained, wherein the rigid housing is characterized by a longitudinal body section and a lateral body section extending from and normal to the longitudinal body section, wherein an intersection of the longitudinal body section and the lateral body section defines an interior corner and an exterior corner, and wherein the rigid housing defines a flange extending about the rigid housing; and
a lid extending across the rigid housing and sealed to the rigid housing at a seam defined between the lid and the flange, wherein the lid is characterized by a perimeter external edge defined outward from the seam, wherein the lid defines a first protrusion extending outward from the perimeter external edge beyond an exterior edge of the lid on a first side of the lid extending to the exterior corner of the rigid housing, wherein the lid defines a second protrusion extending outward from the perimeter external edge beyond the exterior edge of the lid on a second side of the lid, and wherein each of the first protrusion and the second protrusion is configured to provide structural reinforcement to the seam.

17. The battery of claim 16, wherein the rigid housing defines the interior corner as an arcuate shape recessed from a planar intersection of a sidewall of the lateral body section and a sidewall of the longitudinal body section.

18. The battery of claim 16, wherein the lid is welded to the rigid housing along the flange of the rigid housing, and wherein the seam comprises a weld seam extends continuously about the enclosure.

19. The battery of claim 16, wherein the first side of the lid is a longitudinal side of the lid extending to the exterior corner and the second side of the lid is a lateral side of the lid extending to the exterior corner, and wherein the second protrusion extends beyond an exterior edge of the lid on the lateral side of the lid.

20. The battery of claim 19, wherein the lid defines at least two protrusions along the longitudinal side of the lid extending to the exterior corner.

* * * * *

UNITED STATES PATENT AND TRADEMARK OFFICE
CERTIFICATE OF CORRECTION

PATENT NO. : 11,848,454 B2
APPLICATION NO. : 16/844865
DATED : December 19, 2023
INVENTOR(S) : Abhishek P. Shiwalkar and Christopher R. Pasma Page 1 of 1

It is certified that error appears in the above-identified patent and that said Letters Patent is hereby corrected as shown below:

In the Claims

Column 15, Claim 12, Lines 20-21, delete "extending about the a lid extending" insert --extending about the rigid housing; a lid--

Signed and Sealed this
Thirteenth Day of August, 2024

Katherine Kelly Vidal
*Director of the United States Patent and Trademark Office*